US00RE44349E

(19) United States
(12) Reissued Patent
Naranjo

(10) Patent Number: US RE44,349 E
(45) Date of Reissued Patent: Jul. 9, 2013

(54) COMBINED ILLUMINATED TABLE AND CANOPY AND ASSOCIATED METHOD

(76) Inventor: Jaime Naranjo, Venice, CA (US)

(21) Appl. No.: 13/398,666

(22) Filed: Feb. 16, 2012

Related U.S. Patent Documents

Reissue of:
(64) Patent No.: 7,661,836
Issued: Feb. 16, 2010
Appl. No.: 11/998,191
Filed: Nov. 29, 2007

U.S. Applications:
(60) Provisional application No. 60/861,269, filed on Nov. 29, 2006.

(51) Int. Cl.
*F21V 33/00* (2006.01)

(52) U.S. Cl.
USPC ..... 362/102; 362/234; 362/394

(58) Field of Classification Search
USPC ..... 362/102, 576, 183, 234, 249.02, 362/249.05, 249.12, 249.13, 276, 295, 394, 362/411, 800, 802; 135/66, 910
See application file for complete search history.

(56) References Cited

U.S. PATENT DOCUMENTS 4,174,532 A 11/1979 Kelley
5,053,931 A * 10/1991 Rushing ..... 362/102
5,463,535 A 10/1995 Vest
5,584,564 A 12/1996 Phyle
5,734,229 A 3/1998 Bavaro
5,876,262 A 3/1999 Kelly
6,017,188 A 1/2000 Benton
6,298,866 B1 10/2001 Molnar, IV
7,331,684 B2 2/2008 Tung
7,497,583 B2 3/2009 Ma
2006/0152916 A1 7/2006 Lee

* cited by examiner

*Primary Examiner* — Bao Q Truong
(74) *Attorney, Agent, or Firm* — Cislo & Thomas, LLP

(57) ABSTRACT

A combined illuminated table and canopy includes a free-standing table, a canopy adjustably connected to the table and disposed thereabove at an elevated position, and means for illuminating a perimeter of the table such that a top surface of the table becomes illuminated. Such an illuminating means includes a plurality of light-emitting sources attached to the table, a transformer electrically coupled directly to the light-emitting sources, and releasably engaged male and female shafts have detachably abutted first and second contacts. A solar panel is electrically coupled to the first contact, and a contact mechanism is electrically connected to such first and second contacts as well as the existing external supply source in such a manner that the existing external power supply source is automatically disengaged from the light-emitting sources when the first contact is engaged from the second contact.

26 Claims, 7 Drawing Sheets

COMBINED ILLUMINATED TABLE AND CANOPY AND ASSOCIATED METHOD

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Application No. 60/861,269, filed Nov. 29, 2006, the entire disclosures of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Technical Field

This invention relates to tables and, more particularly, to a combined illuminated table and canopy for providing user enjoyment in dark ambient areas.

2. Prior Art

More homes have dining rooms than ever before, statistics show, and builders are making the rooms bigger rather than smaller. Unlike formal living rooms, which are getting smaller and have even disappeared in some houses, dining rooms are staying for a variety of emotional and practical reasons. Although most individuals don't spend a lot of time thinking about dining tables, they are a very important piece of furniture. We eat meals on them, put hot dishes on them, spill food and drink on them, write on them, read the newspaper on them and gather around them to discuss the worries of the world. We ask a lot from our dining tables.

Many people may prefer to relax in an armchair with a TV dinner, but we still need dining tables, whether for a family get-together, dinner party or leisurely meal. Many of us still use dining tables for special occasions or romantic settings, using candles to create a special ambiance as there's nothing as soothing as candlelight, especially on a dull winter's night. Based on the above mentioned needs, it would be advantageous to provide a means for providing an independent light source for illuminating a surface of a table.

U.S. Pat. No. 5,734,229 to Bavaro discloses a back-up power system for a portable table lamp which accommodates a standard replaceable compact fluorescent bulb that is illuminated from an AC main power source when AC house current is available and is illuminated by a DC to DC converter when AC house current is unavailable. The converter is powered by replaceable low voltage battery located in the base of the lamp and charged by the AC source, and the loss of AC house current is sensed to cause the disconnection of the AC house current source and connection to the low voltage replaceable battery. Unfortunately, this prior art example does not include a light source built into the surface of a table.

U.S. Pat. No. 5,876,262 to Kelly discloses a light table having a table top surface fabricated of translucent or transparent polymer material, one surface being of a smooth and planar configuration, while the alternative surface may include a series of integral sockets, and into which various light blocks or game pieces may insert, and be built up into structured configurations. The smooth table top surface may be used with planar light transmitting pieces, tinted to various colors, be either translucent or transparent in configuration, and through their combination can provide both pleasure through their usage, and a source of education to the child regarding light and its transmission and color mixing to attain various coloration. The light blocks may be fabricated as fiber optics, and scintillating fiber optics, or of translucent material, to enhance the transmission of light emanating from the illuminating lamps provided within the interchangeable table top surfaces of this invention. The light table may incline. Unfortunately, this prior art example is not designed for use as a standard table.

U.S. Pat. No. 6,017,188 to Benton discloses a patio table and fan combination. The device uses a fan mounted on a pole that passes through the center of the patio table. The pole also supports an umbrella that can be used for shade when the table is located outside. The fan motor is mounted co-axially with the fan. The device includes pole mounted lights and a mist device. The patio table fan combination is powered by conventional household electrical outlet or by solar panels mounted on the patio umbrella. The central pole for the device comes in three pieces to facilitate shipping and assembly. Unfortunately, this prior art example does not include a light source built into the surface of a table.

Accordingly, the present invention is disclosed in order to overcome the above noted shortcomings. The present invention is convenient and easy to use, lightweight yet durable in design, and designed for providing user enjoyment in dark ambient areas. The combined illuminated table and canopy is simple to use, inexpensive, and designed for many years of repeated use.

BRIEF SUMMARY OF THE INVENTION

In view of the foregoing background, it is therefore an object of the present invention to provide an apparatus for providing user enjoyment in dark ambient areas. These and other objects, features, and advantages of the invention are provided by a combined illuminated table and canopy.

A combined illuminated table and canopy includes a free-standing table, a canopy adjustably connected to the table and disposed thereabove at an elevated position, and a mechanism for illuminating a perimeter of the table such that a top surface of the table becomes illuminated. Such an illuminating mechanism includes a plurality of light-emitting sources attached to the table, a transformer electrically coupled directly to the light-emitting sources, and releasably engaged male and female shafts have detachably abutted first and second contacts. A solar panel is electrically coupled to the first contact, and a contact mechanism is electrically connected to such first and second contacts as well as the existing external supply source in such a manner that the existing external power supply source is effectively and automatically disengaged from the light-emitting sources when the first contact is engaged from the second contact. The first contact is engaged and disengaged from the second contact when the male and female shafts are engaged and disengaged respectively.

The illuminating mechanism is automatically toggled between first and second operating modes when the canopy is detached and connected to the table such that the illuminating mechanism is conveniently powered by first and second mutually exclusive power supply sources respectively. Such a first power supply source is an existing wall outlet, and such a second power supply source includes the solar panel. Each of the light-emitting sources is contiguously disposed along respective linear edges of the table and extend parallel thereto respectively.

The contact mechanism includes a first contact mechanism electrically coupled directly to the existing external power supply source, a second contact mechanism electrically coupled directly to the second contact, and a third contact mechanism electrically coupled directly to the first contact. Such second and third contact mechanisms are electrically engaged when the male shaft is advantageously disengaged from the female shaft, and the first and third contact mechanisms are electrically engaged when the first and second contacts are engaged.

A method for illuminating a combined table and canopy assembly includes the steps of: providing a free-standing table; adjustably connecting a canopy to the table by disposing the canopy at an elevated position above the table; and illuminating a perimeter of the table such that a top surface of the table becomes illuminated; and automatically toggling the combined table and canopy assembly between first and second operating modes when the canopy is detached and connected to the table such that the combined table and canopy assembly is powered by first and second mutually exclusive power supply sources respectively.

The method further includes the steps of: attaching a plurality of light-emitting sources to the table; electrically coupling a transformer directly to the light-emitting sources; releasably engaging male and female shafts by detachably abutting first and second contacts of the male and female shafts respectively; electrically coupling the first power supply source to the first contact; electrically connecting a contact mechanism to the first and second contacts as well as an existing external supply source in such a manner that the existing external power supply source is automatically disengaged from the light-emitting sources when the first contact is engaged [from] *with* the second contact; and engaging and disengaging the first contact from the second contact by engaging and disengaging the male and female shafts respectively.

The method further includes the steps of: providing a first contact mechanism electrically coupled directly to the existing external power supply source; providing a second contact mechanism electrically coupled directly to the second contact; and providing a third contact mechanism electrically coupled directly to the first contact.

The method further includes the steps of: electrically engaging the second and third contact mechanisms by [disengaging] *engaging* the male shaft [from] *with* the female shaft; electrically engaging the [first] *second* and third contact mechanisms by engaging the first and second contacts; and contiguously disposing each of the light-emitting sources along respective linear edges of the table by extending each of the light-emitting sources parallel to the linear edges respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
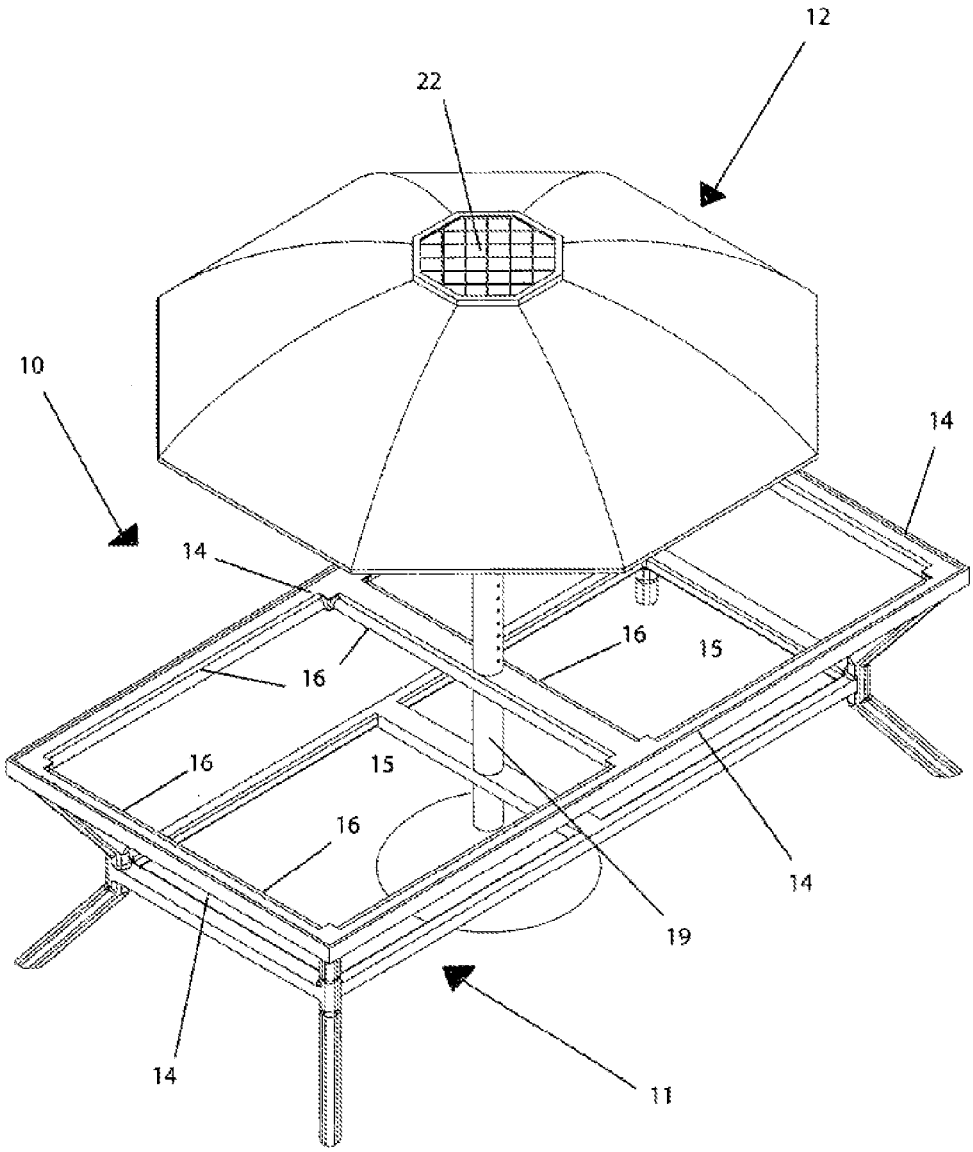
FIG. 1 is a perspective view showing a combined illuminated table and canopy, in accordance with the present invention.
Figure 2:
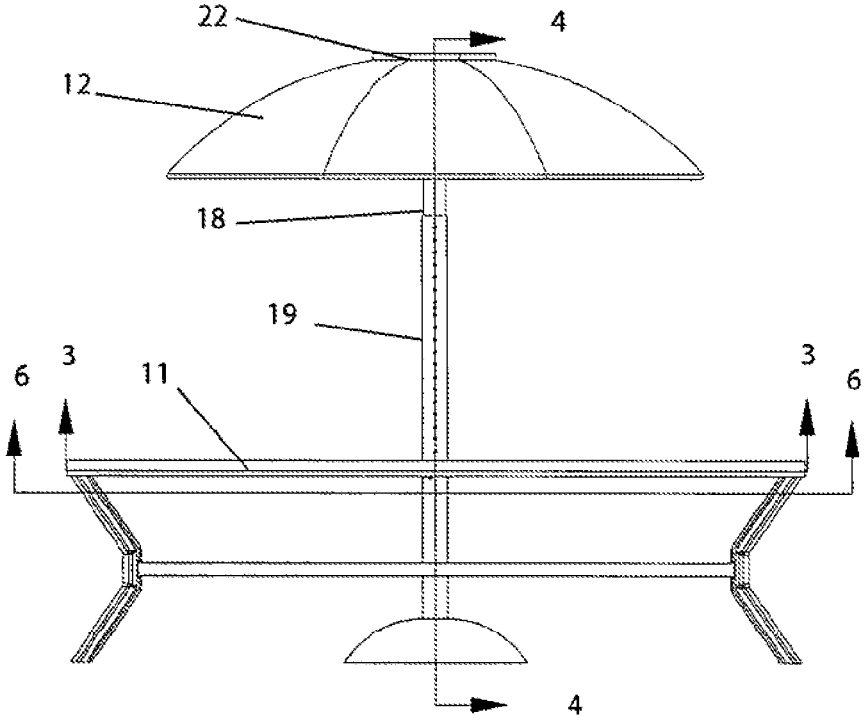
FIG. 2 is a side elevational view of a combined illuminated table and canopy, in accordance with the present invention.
Figure 3:
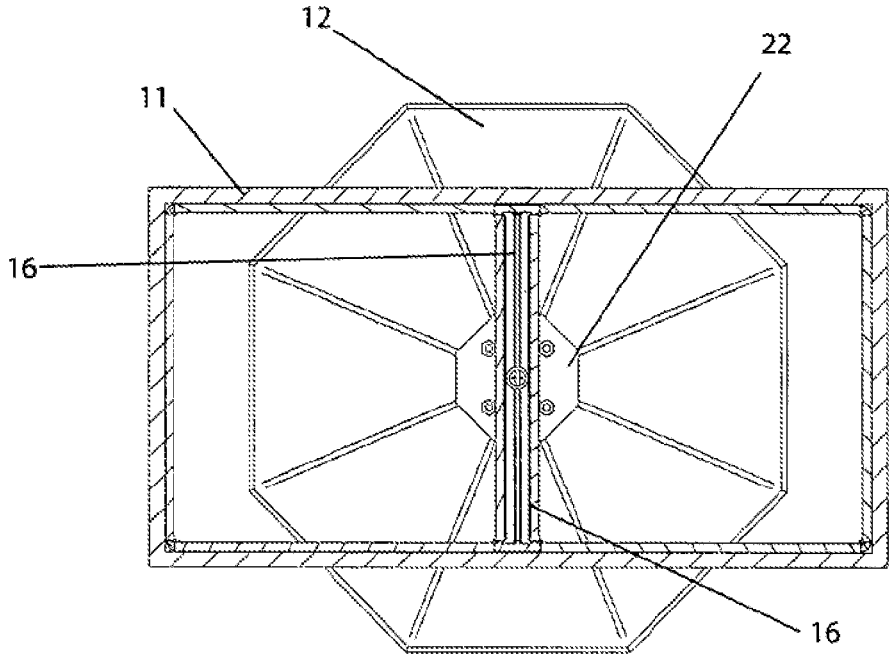
FIG. 3 is a cross sectional view, taken along line 3-3, as seen in FIG. 2.
Figure 4:
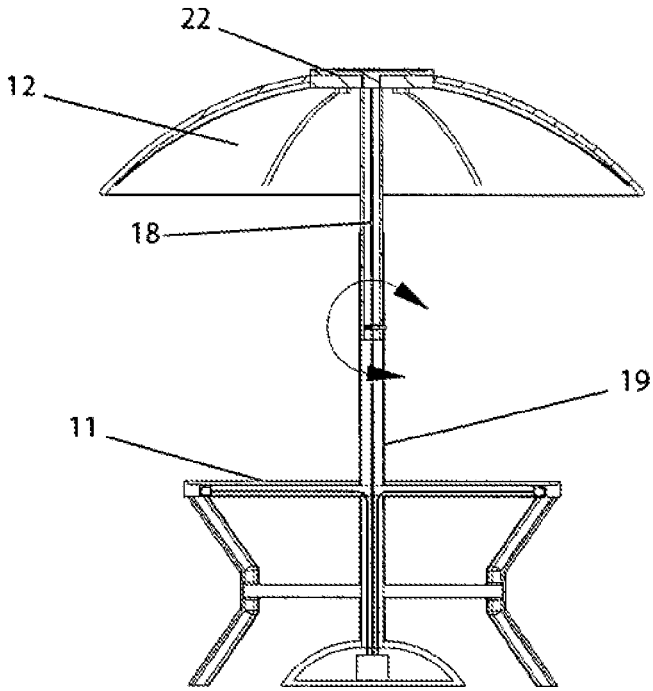
FIG. 4 is a cross sectional view, taken along line 4-4, as seen in FIG. 2.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-10 by the reference numeral 10 and is intended to protect a combined illuminated table and canopy. It should be understood that the assembly 10 may be used to protect many different types of tables and should not be limited in use with only those tables mentioned herein.

Referring initially to FIGS. 1-10, a combined illuminated table and canopy includes a free-standing table 11, a canopy 12 adjustably connected to the table 11 and disposed thereabove at an elevated position, and a mechanism 13 for illuminating a perimeter 14 of the table 11 which is essential such that a top surface 15 of the table 11 becomes illuminated. Such an illuminating mechanism 13 includes a plurality of light-emitting sources 16 attached to the table 11, a transformer 17 electrically coupled directly, without the use of intervening elements, to the light-emitting sources 16, and releasably engaged male and female shafts 18, 19 have detachably abutted first and second contacts 20, 21. A solar panel 22 is electrically coupled to the first contact 20, and a contact mechanism 23 is electrically connected to such first and second contacts 20, 21 as well as an existing external supply source 24 in such a manner that the existing external power supply source 24 is automatically disengaged from the light-emitting sources 16 when the first contact 20 is engaged with the second contact 21. The first contact 20 is engaged and disengaged from the second contact 21 when the male and female shafts 18, 19 are engaged and disengaged respectively. The canopy 12 provides a shelter for the table 11 and a user seated at the table 11.

Figure 5:
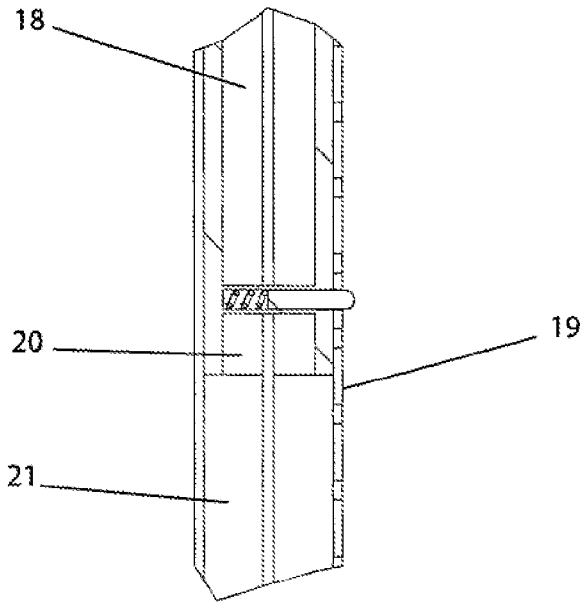
FIG. 5 is a cross sectional view, taken along line 5-5, as seen in FIG. 4.
Figure 6:
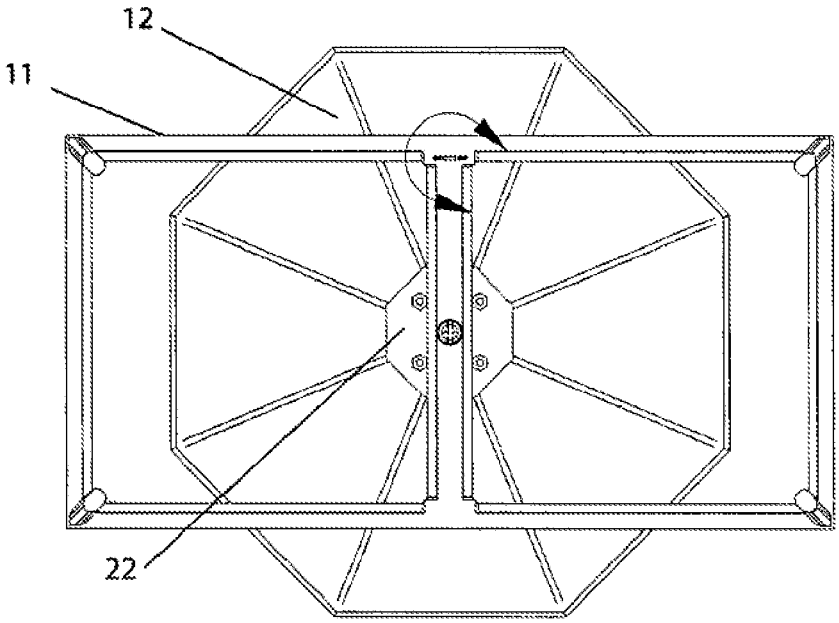
FIG. 6 is a cross sectional view, taken along line 6-6, as seen in FIG. 2.
Figure 7:
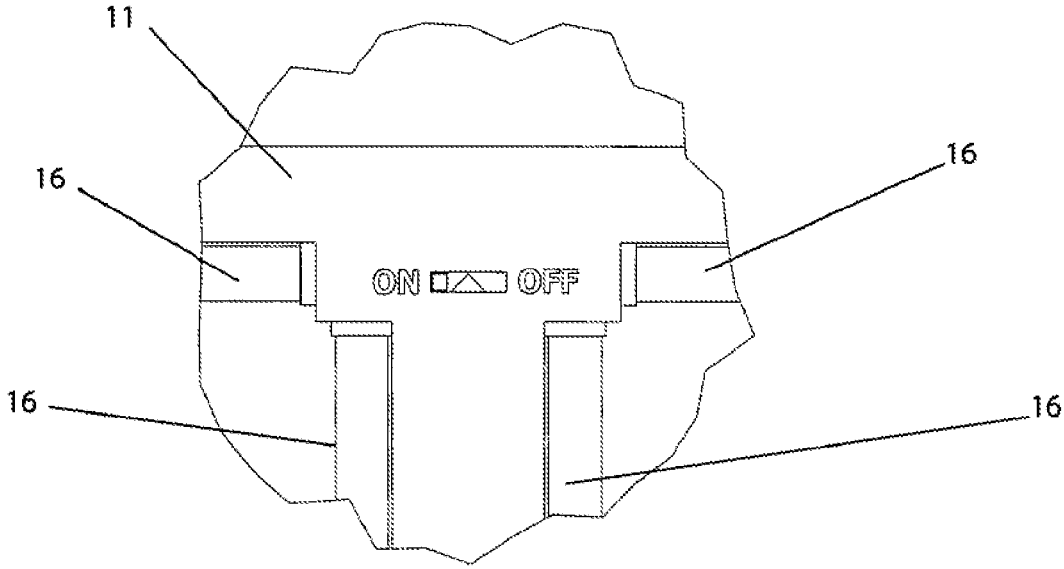
FIG. 7 is an enlarged view of an on/off switch as seen in FIG. 6.
Figure 8:
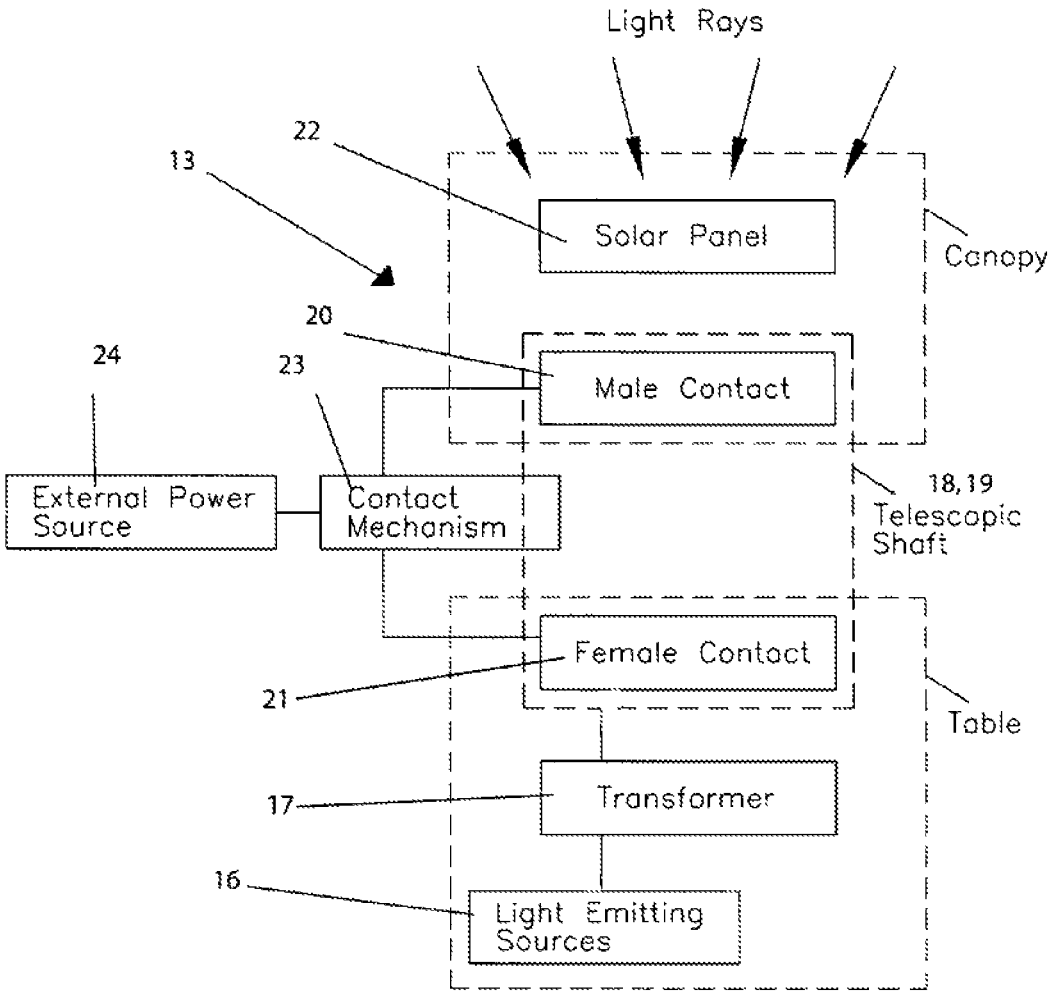
FIG. 8 is a schematic block diagram illustrating the interrelationship of the major electromechanical components of the illuminating mechanism, in accordance with the present invention.
Figure 9:
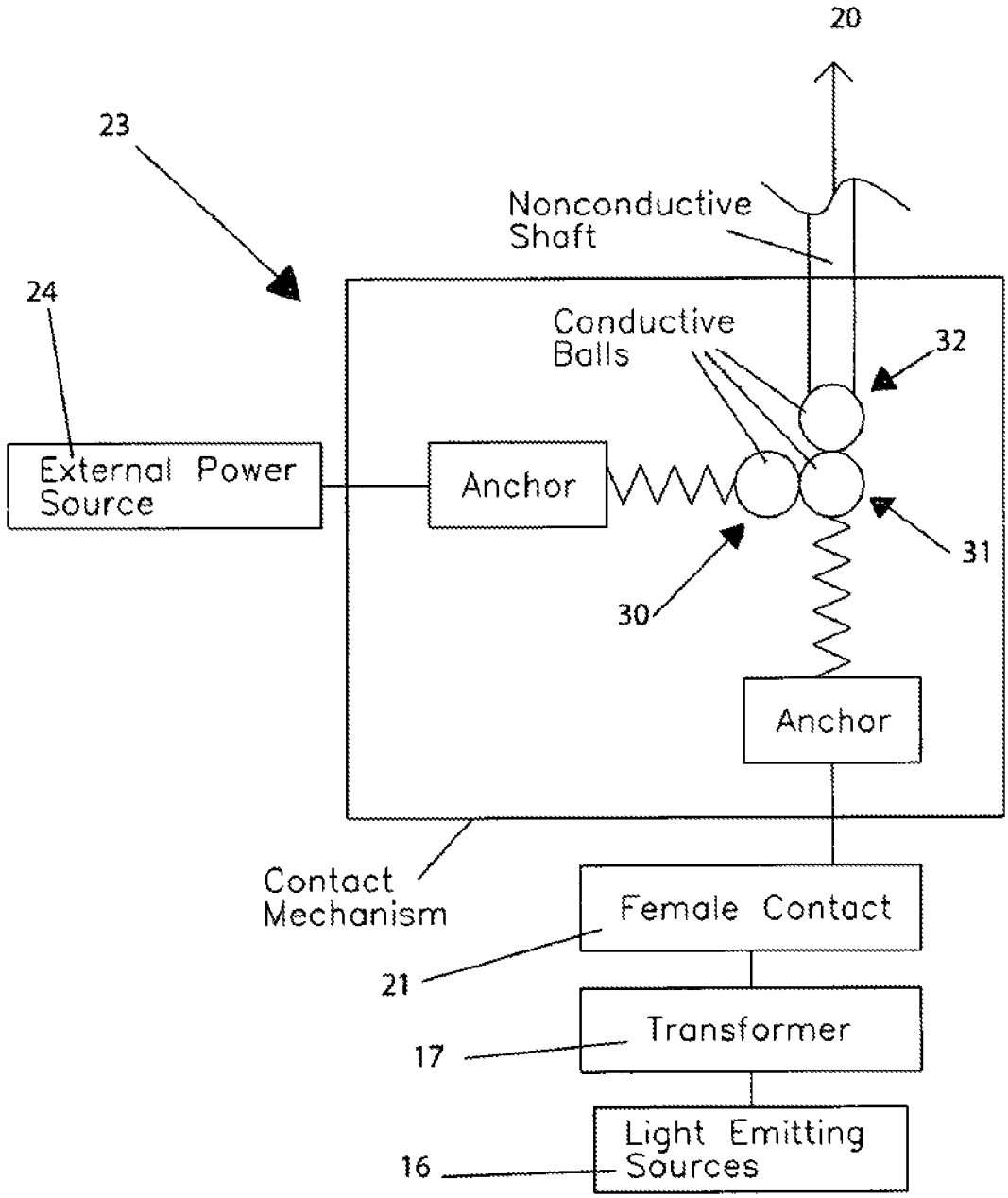
FIGS. 9-10 are schematic block diagrams illustrating the interrelationship between the major electromechanical components of the contact mechanism.
Figure 10:
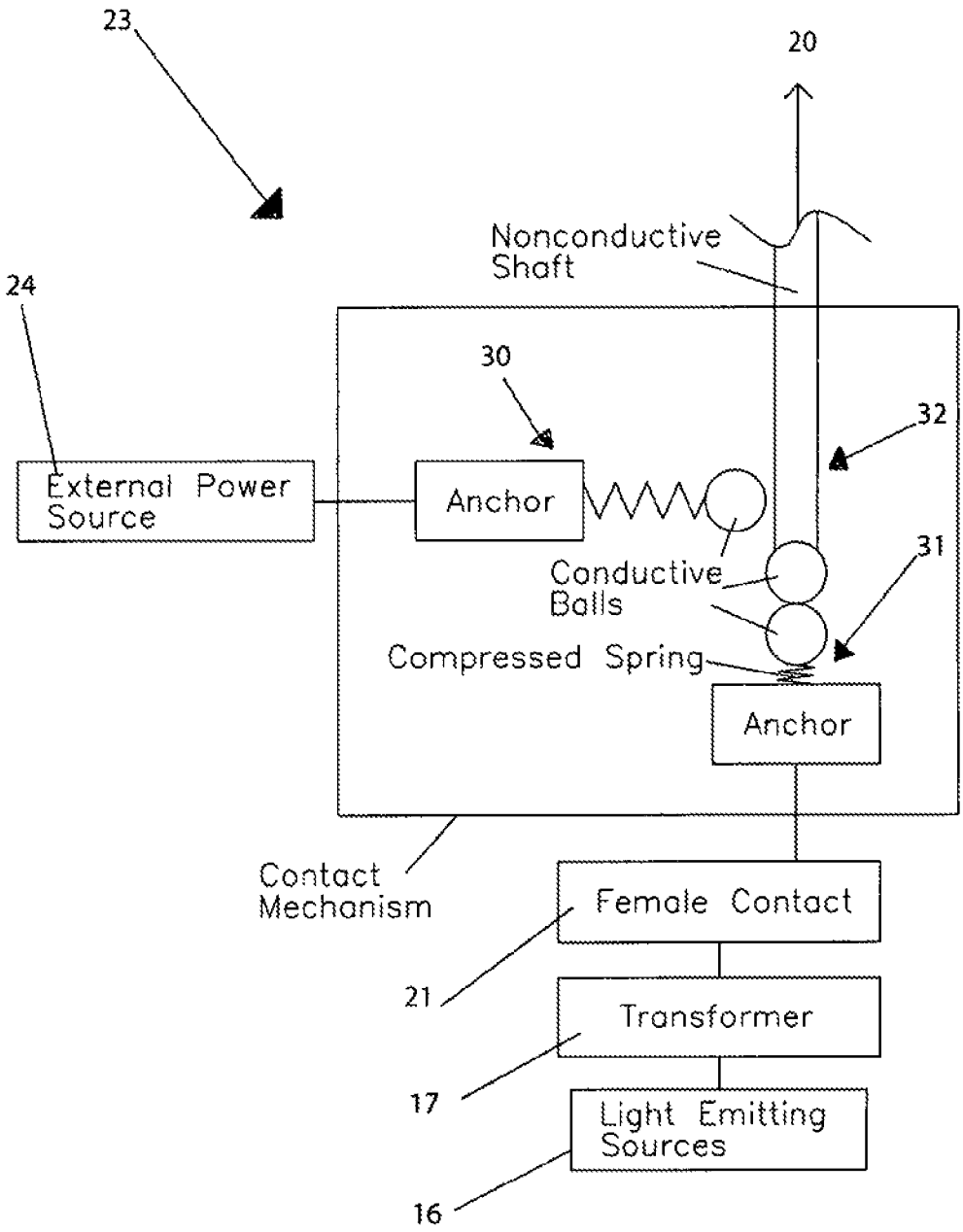

Referring to FIGS. 5, 9 and 10, the illuminating mechanism 13 is automatically toggled between first and second operating modes when the canopy 12 is detached and connected to the table 11 which is vital such that the illuminating mechanism 13 is powered by first and second mutually exclusive power supply sources (external power supply source 24 and solar panel 22) respectively. Such a first power supply source 24 is an existing wall outlet, and such a second power supply source includes the solar panel 22. Each of the light-emitting sources 16 is contiguously disposed along respective linear edges of the table 11 and extends parallel thereto respectively. The light emitting sources illuminate the edges of the table 11 and may be powered by solar or electronic power sources, as noted hereinabove.

Referring again to FIGS. 9-10, the contact mechanism 23 includes a first contact mechanism 30 electrically coupled directly, without the use of intervening elements, to the existing external power supply source 24. A second contact mechanism 31 is electrically coupled directly, without the use of intervening elements, to the second contact 21, and a third contact mechanism 32 electrically coupled directly, without the use of intervening elements, to the first contact 20. Such second and third contact mechanisms 31, 32 are electrically [engaged] *disengaged* when the male shaft 18 is disengaged from the female shaft 19, and the [first] *second* and third contact mechanisms [30] *31*, 32 are electrically engaged when the first and second contacts 20, 21 are engaged, respectively.

As best shown in FIGS. 9-10, when the non-conductive shaft and conductive ball of the third contact mechanism 32 extend downwardly, the spring member and conductive ball of the first contact mechanism 30 returns to equilibrium and disengages the conductive ball of the second contact mechanism 31. This relationship disengages the external power supply source and allows power to travel from the solar panel 22 to the light emitting sources 16. Alternately, when the non-conductive shaft and conductive ball of the third contact mechanism 32 extend upwardly, the spring member and conductive ball of the first contact mechanism 30 is compressed and engages the conductive ball of the second contact mechanism 31. This relationship disengages the conductive balls of the second and third contact mechanisms 31, 32 and thereby disengages an electrical current from the solar panel 22. Thus, power is transmitted from external power supply source to the light emitting sources 16.

The assembly includes rectangular glass and metal tables equipped with battery and/or solar panel powered lights. Of course, such tables can be manufactured from a variety of suitable materials and in a variety of sizes, as is obvious to a person of ordinary skill in the art. Such tables include a top surface affixed to a support assembly that is integrally attached to four legs, respectively. The support assembly is positioned on the underside of the table top and advantageously extends across the central area, traversing approximately two-thirds of the table top length, as an example.

A metal cross bar extends outward from the center of the support assembly and traverses the width of the table top, which is essential for providing a stable platform. The table legs extend downwardly from each corner of the support assembly and are gradually curved inward toward the middle. The assembly includes a string of small lights, interconnected by electrical wiring, that are positioned around the outer periphery of each table top, on the underside, with additional lights angling in from each corner of the table top.

Such lights are electrically connected in series with an on/off switch and power supply, which is vital for allowing a user to switch the lights on and off as desired. Of course, such lights can be produced in a variety of shapes and sizes, as is obvious to a person of ordinary skill in the art. Such a switch controls the power supply, which alternates between a solar panel and batteries, and is discreetly positioned on the underside of the table. Of course, such a switch can be located in a variety of positions, as is obvious to a person of ordinary skill in the art. Such a solar panel resides at the top of an umbrella that fits through the hole in the center of the table, which is critical for allowing the solar panel function at peak efficiency.

The present invention, as claimed, provides the unexpected and unpredictable benefit of an assembly that is convenient and easy to use, is lightweight yet durable in design, and provides an independent light source for illuminating a surface of a table. Such an assembly is most beneficial for various night life scenarios. Restaurants can feature these tables outdoors or indoors as a new, exciting means of lighting individual tables. The assembly keeps the light where it is needed the most, on the table. This is where orders are being taken, and customers are eating and drinking.

Such an assembly allows servers to be able to see if the customers need anything. At home, the assembly provides the only lighting needed for a romantic dinner or party, or sets the mood lighting as desired. The present invention eliminates the use of candles that can easily blow out, cause a mess, or start a fire. The internal power capabilities of the assembly eliminate the use of power cords that create a tripping hazard. The assembly is inexpensive and adds a much needed light source to many activities surrounding a table.

In use, a method for illuminating a combined table and canopy assembly includes the steps of: providing a free-standing table; adjustably connecting a canopy to the table by disposing the canopy at an elevated position above the table; and illuminating a perimeter of the table such that a top surface of the table becomes illuminated; and automatically toggling the combined table and canopy assembly between first and second operating modes when the canopy is detached and connected to the table such that the combined table and canopy assembly is powered by first and second mutually exclusive power supply sources respectively.

In use, the method further includes the steps of: attaching a plurality of light-emitting sources to the table; electrically coupling a transformer directly, without the use of intervening elements, to the light-emitting sources; releasably engaging male and female shafts by detachably abutting first and second contacts of the male and female shafts respectively; electrically coupling the first power supply source to the first contact; electrically connecting a contact mechanism to the first and second contacts as well as an existing external supply source in such a manner that the existing external power supply source is automatically disengaged from the light-emitting sources when the first contact is engaged from the second contact; and engaging and disengaging the first contact from the second contact by engaging and disengaging the male and female shafts respectively.

In use, the method further includes the steps of: providing a first contact mechanism electrically coupled directly, without the use of intervening elements, to the existing external power supply source; providing a second contact mechanism electrically coupled directly, without the use of intervening elements, to the second contact; and providing a third contact mechanism electrically coupled directly, without the use of intervening elements, to the first contact.

In use, the method further includes the steps of: electrically engaging the second and third contact mechanisms by [disengaging] *engaging* the male shaft [from] *with* the female shaft; electrically engaging the first and [third] *second* contact mechanisms by [engaging] *disengaging* the first and second contacts; and contiguously disposing each of the light-emitting sources along respective linear edges of the table by extending each of the light-emitting sources parallel to the linear edges respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined illuminated table and canopy for providing user enjoyment in dark ambient areas, said combined illuminated table and canopy comprising:

a table;

a canopy adjustably connected to said table; and means for illuminating a perimeter of said table such that a top surface of said table becomes illuminated;

wherein said illuminating means is automatically toggled between first and second operating modes when said canopy is detached and connected to said table such that said illuminating means is powered by first and second mutually exclusive power supply sources respectively;

wherein said first power supply source is an existing wall outlet;

wherein said second power supply source comprises a solar panel.

2. The combined illuminated table and canopy of claim 1, wherein said illuminating means comprises:

a plurality of light-emitting sources attached to said table;

a transformer electrically coupled directly to said light-emitting sources;

releasably engaged male and female shafts having detachably abutted first and second contacts, said solar panel being electrically coupled to said first contact;

a contact mechanism electrically connected to said first and second contacts as well as the existing external supply source in such a manner that the existing external power supply source is automatically disengaged from said light-emitting sources when said first contact is engaged [from] *with* said second contact;

wherein said first contact is engaged and disengaged from said second contact when said male and female shafts are engaged and disengaged respectively.

3. The combined illuminated table and canopy of claim 2, wherein said contact mechanism comprises:

a first contact mechanism electrically coupled directly to the existing external power supply source;

a second contact mechanism electrically coupled directly to said second contact; and a third contact mechanism electrically coupled directly to said first contact.

4. The combined illuminated table and canopy of claim 3, wherein said second and third contact mechanisms are electrically engaged when said male shaft is [disengaged from] *engaged with* said female shaft.

5. The combined illuminated table and canopy of claim 3, wherein said first and [third] *second* contact mechanisms are electrically engaged when said first and second contacts are [engaged] *disengaged*.

6. The combined illuminated table and canopy of claim 3, wherein said each of said light-emitting sources are contiguously disposed along respective linear edges of said table and extend parallel thereto respectively.

7. A combined illuminated table and canopy for providing user enjoyment in dark ambient areas, said combined illuminated table and canopy comprising:

a free-standing table;

a canopy adjustably connected to said table and disposed thereabove at an elevated position; and means for illuminating a perimeter of said table such that a top surface of said table becomes illuminated;

wherein said illuminating means is automatically toggled between first and second operating modes when said canopy is detached and connected to said table such that said illuminating means is powered by first and second mutually exclusive power supply sources respectively;

wherein said first power supply source is an existing wall outlet;

wherein said second power supply source comprises a solar panel.

8. The combined illuminated table and canopy of claim 7, wherein said illuminating means comprises:

a plurality of light-emitting sources attached to said table;

a transformer electrically coupled directly to said light-emitting sources;

releasably engaged male and female shafts having detachably abutted first and second contacts, said solar panel being electrically coupled to said first contact;

a contact mechanism electrically connected to said first and second contacts as well as the existing external supply source in such a manner that the existing external power supply source is automatically disengaged from said light-emitting sources when said first contact is engaged [from] *with* said second contact;

wherein said first contact is engaged and disengaged from said second contact when said male and female shafts are engaged and disengaged respectively.

9. The combined illuminated table and canopy of claim 8, wherein said contact mechanism comprises:

a first contact mechanism electrically coupled directly to the existing external power supply source;

a second contact mechanism electrically coupled directly to said second contact; and a third contact mechanism electrically coupled directly to said first contact.

10. The combined illuminated table and canopy of claim 9, wherein said second and third contact mechanisms are electrically engaged when said male shaft is [disengaged from] *engaged with* said female shaft.

11. The combined illuminated table and canopy of claim 9, wherein said first and [third] *second* contact mechanisms are electrically engaged when said first and second contacts are [engaged] *disengaged*.

12. The combined illuminated table and canopy of claim 9, wherein said each of said light-emitting sources are contiguously disposed along respective linear edges of said table and extend parallel thereto respectively.

13. A method for illuminating a combined table and canopy assembly, said method comprising the steps of:

a. providing a free-standing table;

b. adjustably connecting a canopy to said table by disposing said canopy at an elevated position above said table; [and]

c. illuminating a perimeter of said table such that a top surface of said table becomes illuminated; and d. automatically toggling said combined table and canopy assembly between first and second operating modes when said canopy is detached and connected to said table such that said combined table and canopy assembly is powered by first and second mutually exclusive power supply sources respectively.

14. The method of claim 13, wherein step d. comprises the steps of:

attaching a plurality of light-emitting sources to said table;

electrically coupling a transformer directly to said light-emitting sources;

releasably engaging male and female shafts by detachably abutting first and second contacts of said male and female shafts respectively;

electrically coupling said first power supply source to said first contact;

electrically connecting a contact mechanism to said first and second contacts as well as an existing external supply source in such a manner that the existing external power supply source is automatically disengaged from said light-emitting sources when said first contact is engaged [from] *with* said second contact; and engaging and disengaging said first contact from said second contact by engaging and disengaging said male and female shafts, respectively.

15. The method of claim 14, wherein step d. further comprises the steps of:

providing a first contact mechanism electrically coupled directly to the existing external power supply source;

providing a second contact mechanism electrically coupled directly to said second contact; and providing a third contact mechanism electrically coupled directly to said first contact.

16. The method of claim 15, further comprising the steps of: electrically engaging said second and third contact mechanisms by [disengaging] *engaging* said male shaft [from] *with* said female shaft.

17. The method of claim 15, further comprising the steps of: electrically engaging said first and [third] *second* contact mechanisms by [engaging] *disengaging* said first and second contacts.

18. The method of claim 15, further comprising the steps of: contiguously disposing said each of said light-emitting sources along respective linear edges of said table by extending each of said light-emitting sources parallel to said linear edges respectively.

*19. A combined illuminated table and canopy for providing user enjoyment in dark ambient areas, said combined illuminated table and canopy comprising:*

*a table;*

*a canopy adjustably connected to said table; and*

*means for illuminating a perimeter of said table such that a top surface of said table becomes illuminated,*

*wherein said illuminating means is automatically toggled between first and second operating modes when said canopy is detached and connected to said table such that said illuminating means is powered by first and second mutually exclusive power supply sources, respectively,*

*wherein said first power supply source is selected from the group consisting of an external power supply source, and a battery power; and*

*wherein said second power supply source is a solar panel.*

*20. The combined illuminated table and canopy of claim 19,*

*wherein said first power supply source is said battery.*

*21. The combined illuminated table and canopy of claim 20, wherein said battery is positioned under said table.*

*22. The combined illuminated table and canopy of claim 20, wherein said illuminating means comprises:*

*a plurality of light-emitting sources attached to said table;*

*a transformer electrically coupled directly to said light-emitting sources;*

*releasably engaged male and female shafts having detachably abutted first and second contacts, said solar panel being electrically coupled to said first contact;*

*a contact mechanism electrically connected to said first and second contacts as well as the battery in such a manner that the battery is automatically disengaged from said light-emitting sources when said first contact is engaged with said second contact;*

*wherein said first contact is engaged and disengaged from said second contact when said male and female shafts are engaged and disengaged, respectively.*

*23. The combined illuminated table and canopy of claim 22, wherein said contact mechanism comprises:*

*a first contact mechanism electrically coupled directly to said battery;*

*a second contact mechanism electrically coupled directly to said second contact; and*

*a third contact mechanism electrically coupled directly to said first contact.*

*24. The combined illuminated table and canopy of claim 23, wherein said second and third contact mechanisms are electrically engaged when said male shaft is engaged with said female shaft.*

*25. The combined illuminated table and canopy of claim 23, wherein said first and second contact mechanisms are electrically engaged when said first and second contacts are disengaged.*

*26. The combined illuminated table and canopy of claim 23, wherein said each of said light-emitting sources are contiguously disposed along respective linear edges of said table and extend parallel thereto respectively.*

* * * * *